United States Patent [19]
Cotrel et al.

[11] 3,884,921

[45] May 20, 1975

[54] ISOINDOLINE DERIVATIVES

[75] Inventors: Claude Cotrel, Val-de-Marne; Claude Jeanmart; Mayer Naoum Messer, both of Essonne, all of France

[73] Assignee: Rhone-Poulenc, S.A., Paris, France

[22] Filed: Dec. 29, 1972

[21] Appl. No.: 319,879

[30] Foreign Application Priority Data
Jan. 10, 1972  France .............................. 72.00650
Nov. 21, 1972  France .............................. 72.41272

[52] U.S. Cl. ... 260/268 BQ; 260/268 C; 260/287 R; 424/250
[51] Int. Cl............................................. C07d 51/70
[58] Field of Search .... 260/268 BC, 268 BQ, 268 C Primary Examiner—Donald G. Daus
Assistant Examiner—Jose Tovar
Attorney, Agent, or Firm—Stevens, Davis, Miller & Mosher

[57] ABSTRACT

Isoindolin-1-one derivatives substituted in the 2-position by an unsubstituted or substituted quinolyl radical, substituted in the 3-position by a 4-methylpiperazin-1-ylcarbonyloxy or 4-methylpiperazin-1-yl-carbonyloxy 4-oxide group, and optionally substituted in the 4- to 7-positions by one or more halogen atoms, or alkyl, alkoxy or nitro radicals, possess pharmacological properties and are particularly active as tranquilisers and anti-convulsant agents.

8 Claims, No Drawings

ISOINDOLINE DERIVATIVES

This invention relates to new therapeutically useful isoindoline derivatives, to processes for their preparation and pharmaceutical compositions containing them.

The new isoindoline derivatives of the present invention are those of the general formula:

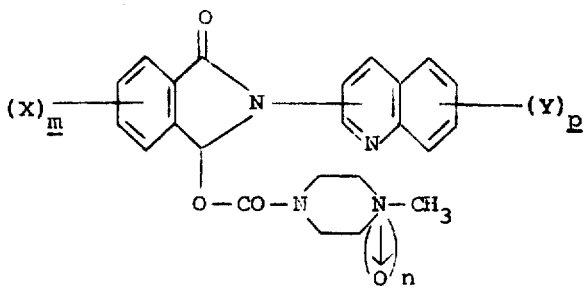

I wherein X represents a halogen atom, or an alkyl or alkoxy radical containing 1 to 4 carbon atoms, or a nitro radical, $m$ represents zero or an integer from 1 to 4, Y represents a halogen atom, or an alkyl or alkoxy radical containing 1 to 4 carbon atoms, or a cyano or nitro radical, $p$ represents zero or an integer from 1 to 4, and $n$ represents zero or 1, and acid addition salts thereof. When symbols $m$ and $p$ represents the integers 2, 3 or 4 it is to be understood that the atoms or radicals present on the isoindoline and quinolyl nuclei may be the same or different.

According to a feature of the invention, the isoindoline derivatives of general formula I wherein $n$ represents zero are prepared by the process which comprises reacting 1-chlorocarbonyl-4-methylpiperazine with an alkali metal salt, optionally prepared in situ, of an isoindoline derivative of the general formula:

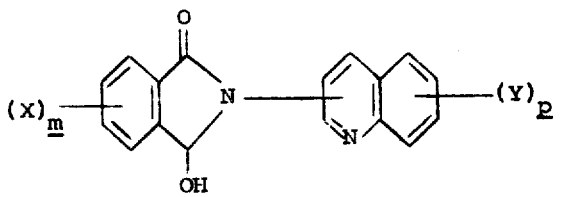

II wherein the various symbols are as hereinbefore defined. The reaction is generally carried out in an anhydrous organic solvent, for example dimethylformamide, at a temperature below 50°C., preferably at 10°-35°C.

The isoindoline derivatives of general formula II can be obtained by the partial reduction of a phthalimide derivative of the general formula:

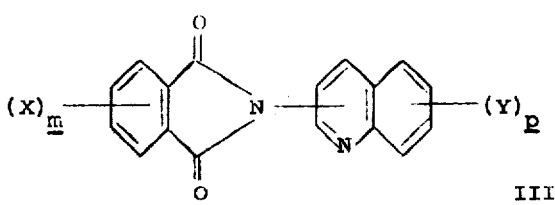

III wherein the various symbols are as hereinbefore defined. The reduction is generally carried out by means of an alkali metal borohydride in an organic (e.g. an alcohol) or an aqueous-organic (e.g. an aqueous alcohol or aqueous dioxan) solution.

When the phthalimido radical is unsymmetrically substituted, the partial reduction of a compound of general formula III can lead to isomeric products which can be separated by physico-chemical methods such as fractional crystallisation or chromatography.

The phthalimide derivatives of general formula III can be obtained by reaction of an aminoquinoline of the general formula:

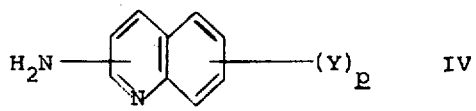

IV (wherein Y and $p$ are as hereinbefore defined) with a phthalic anhydride of the general formula:

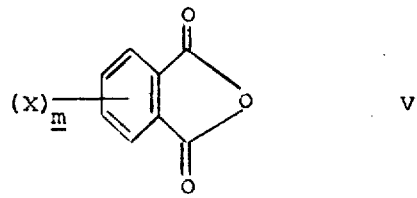

V wherein X and $m$ are as hereinbefore defined.

According to a further feature of the invention, the isoindoline derivatives of general formula I wherein $n$ represents zero are prepared by the process which comprises reacting 1-methylpiperazine with a mixed carbonate of the general formula:

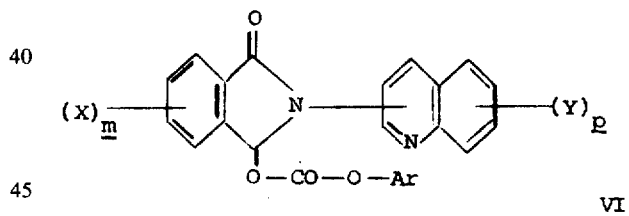

VI wherein X, $m$, Y and $p$ are as hereinbefore defined, and Ar represents a phenyl radical optionally substituted by, for example, an alkyl radical containing 1 to 4 carbon atoms. The reaction is generally carried out in an organic solvent, for example acetonitrile, and at a temperature between 10° and 35°C.

The mixed carbonates of general formula VI can be prepared by reaction of a chloroformate of the general formula:

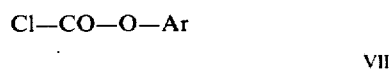

Cl—CO—O—Ar

VII (wherein Ar is as hereinbefore defined) with an isoindoline derivative of general formula II. The reaction is generally carried out in a basic organic solvent, for example pyridine, and at a temperature below or near ambient temperature, e.g. from 5° to 20°C.

According to another feature of the invention, the isoindoline derivatives of general formula I wherein $n$ represents 1 are prepared by the process which comprises oxidising a corresponding compound of general formula I, wherein n is zero, by methods known per se for the N-oxidation of the piperazine nucleus. The oxidation is generally carried out by means of a peracid, for example p-nitroperbenzoic acid, in an organic solvent, for example chloroform, and at a temperature of about 20°C.

The isoindoline derivatives of general formula I obtained by the aforementioned processes can be purified by physical methods such as distillation, crystallisation or chromatography, or by chemical methods such as the formation of salts, crystallisation of the salts and decomposition of them in an alkaline medium. In carrying out the said chemical methods the nature of the anion of the salt is immaterial, the only requirement being that the salt must be well-defined and readily crystallisable.

The isoindoline derivatives of general formula I may be converted by methods known per se into acid addition salts. The acid addition salts may be obtained by the action of acids on the isoindoline derivatives in appropriate solvents. As organic solvents there may be used alcohols, ethers, ketones or chlorinated hydrocarbons. The salt which is formed is precipitated, if necessary after concentration of the solution, and is isolated by filtration or decantation.

By the term "methods known per se" as used in this specification is meant methods heretofore used or described in the chemical literature.

The isoindoline derivatives of the invention and their acid addition salts possess valuable pharmacological properties; they are particularly active as tranquilisers and anti-convulsant agents. In animals (mice) they have proved active as such at doses of between 10 and 100 mg./kg. animal body weight when administered orally, in particular in the following tests:

i. electric battle test according to a technique similar to that of Tedeschi et al. [J. Pharmacol., 125, 28 (1959)], ii. convulsion with pentetrazole according to a technique similar to that of Everett and Richards [J. Pharmacol., 81, 402 (1944)], iii. supramaximal electroshock according to the technique of Swinyard et al. [J. Pharmacol., 106, 319 (1952)], and iv. locomotor activity according to the technique of Courvoisier [Congres de Medecins Alienistes et Neurologistes - Tours - (8/13th June, 1959)] and Julou (Bulletin de la Societe de Pharmacie de Lille, No. 2, January 1967, page 7).

Preferred isoindoline derivatives of the invention are those of general formula I wherein Y represents a halogen (preferably chlorine) atom, or an alkyl (preferably methyl) or alkoxy (preferably methoxy) radical containing 1 to 4 carbon atoms, or a nitro group, and p represents zero or 1, and especially those in which the quinolyl radical is attached through the 2-position to the isoindoline nucleus, and more particularly those compounds wherein m represents zero, and their acid addition salts. Of outstanding importance is 3-(4-methylpiperazin-1-yl)carbonyloxy-2-(7-chloroquinol-2-yl)-isoindolin-1-one.

For therapeutic purposes, the isoindoline derivatives of general formula I may be employed as such or in the form of non-toxic acid addition salts, i.e. salts containing anions which are relatively innocuous to the animal organism in therapeutic doses of the salts (such as hydrochlorides, sulphates, nitrates, phosphates, acetates, propionates, succinates, benzoates, fumarates, maleates, tartrates, theophyllinacetates, salicylates, phenolphthalinates and methylene-bis-β-hydroxynaphthoates) so that the beneficial physiological properties inherent in the bases are not vitiated by side effects ascribable to the anions.

The following Examples illustrate the invention.

EXAMPLE 1

A solution of 3-hydroxy-2-(quinol-2-yl)-isoindolin-1-one (7 g.) in anhydrous dimethylformamide (90 cc.) is added to a suspension of sodium hydride (50% dispersion in mineral oil) (1.35 g.) in anhydrous dimethylformamide (65 cc.), whilst keeping the temperature at about 20°C. When the evolution of gas is complete a solution of 1-chlorocarbonyl-4-methylpiperazine (4.6 g.) in anhydrous dimethylformamide (16 cc.) is added. The reaction mixture is stirred for a further 2 hours after the end of the addition and is then poured into ice-water (1,000 cc.). The product which crystallises is filtered off and then washed with water (150 cc.). After drying, a product (10 g.), which melts at 155°C., is obtained. On recrystallisation from diisopropyl ether (1,150 cc.), 3-(4-methylpiperazin-1-yl)carbonyloxy-2-(quinol-2-yl)isoindolin-1-one (7 g.), which melts at 160°C., is obtained.

3-Hydroxy-2-(quinol-2-yl)isoindolin-1-one can be prepared by adding potassium borohydride (2.2 g.) to a suspension of 2-phthalimidoquinoline (13.6 g.) in methanol (500 cc.), whilst stirring and keeping the temperature at about 15°C. After stirring for one hour at a temperature of about 20°C., the insoluble product is filtered off and then washed with methanol (25 cc.). After drying, a product (11.3 g.), which melts at 172°C., is obtained and is dissolved in methylene chloride (400 cc.). After removing a slight amount of insoluble material, the solution obtained is filtered through silica gel (200 g.) contained in a column 4.2 cm. in diameter. Elution is then carried out with methylene chloride (1,000 cc.). This eluate is discarded. Further elution is carried out with methylene chloride (6,250 cc.) and the solution obtained is concentrated to dryness under reduced pressure. 3-Hydroxy-2-(quinol-2-yl)isoindolin-1-one (6.2 g.), which melts at 176°C., is thus obtained.

2-Phthalimidoquinoline can be prepared according to the method described by A. E. Porai-Koshits et coll, C. R. Acad. Sci. U.R.S.S., 16, 453 (1937).

EXAMPLE 2

Following the procedure of Example 1 but starting with 2-(7-chloroquinol-2-yl)-3-hydroxyisoindolin-1-one (17.4 g.) and 1-chlorocarbonyl-4-methylpiperazine (10.05 g.), 3-(4-methylpiperazin-1-yl)carbonyloxy-2-(7-chloroquinol-2-yl)isoindolin-1-one (15.6 g.), which melts at 174°C., is obtained.

2-(7-Chloroquinol-2-yl)-3-hydroxyisoindolin-1-one, which melts at 203°C., can be prepared by the procedure described in Example 1 by reacting potassium borohydride with 7-chloro-2-phthalimidoquinoline in an aqueous-methanolic medium at a temperature of about 20°C.

7-Chloro-2-phthalimidoquinoline can be prepared by heating a mixture of 2-amino-7-chloroquinoline (18.1 g.) and phthalic anhydride (14.9 g.) in diphenyl ether (330 cc.) at the reflux temperature for 15 minutes.

After cooling to 60°C., diisopropyl ether (330 cc.) is added to the reaction mixture. The product which crystallises is filtered off and then washed with diisopropyl ether (150 cc.). After drying, 7-chloro-2-phthalimidoquinoline (28.2 g.), which melts at 227°C., is obtained.

2-Amino-7-chloroquinoline can be prepared by heating a mixture of 2,7-dichloroquinoline (36.7 g.) and 16N ammonia solution (700 cc.) in an autoclave at 125°C. for 25 hours. After cooling, an insoluble product is filtered off and then washed with water (120 cc.). After drying, a product (34 g.), which melts at about 115°–120°C., is obtained. On recrystallisation from benzene (150 cc.), 2-amino-7-chloroquinoline (10 g.), which melts at 175°C., is obtained.

2,7-Dichloroquinoline can be prepared according to the method described by R. E. Lutz et coll, J. Am. Chem. Soc., 68, 1322 (1946).

EXAMPLE 3

A suspension of 3-hydroxy-2-(7-nitroquinol-2-yl)isoindolin-1-one (7.2 g.) in anhydrous dimethylformamide (70 cc.) is added to a suspension of sodium hydride (50% dispersion in mineral oil)(1.2 g.) in anhydrous dimethylformamide (90 cc.), whilst keeping the temperature at about 20°C. When the evolution of gas has ceased, a solution of 1-chlorocarbonyl-4-methylpiperazine (4 g.) in anhydrous dimethylformamide (25 cc.) is added. The reaction mixture is stirred for a further 3 hours after the end of the addition and is then poured into water (1,075 cc.). The product which crystallises is filtered off and then washed twice with water (total 60 cc.). After drying, a product (8.6 g.), melting at about 228°–230°C., is obtained and is dissolved in methylene chloride (170 cc.). The solution obtained is filtered through silica gel (170 g.) contained in a column 3.6 cm. in diameter. Elution is then carried out with pure methylene chloride (850 cc.), a mixture of methylene chloride and methanol (99-1 by volume; 680 cc.) and a mixture of methylene chloride and methanol (98-2 by volume; 680 cc.). All these eluates are discarded. Further elution is carried out with a mixture of methylene chloride and methanol (98-2 by volume; 680 cc.) and the solution obtained is concentrated to dryness under reduced pressure. After recrystallisation of the residue obtained from a mixture of acetonitrile and dimethylformamide (50—50 by volume; 80 cc.), 3-(4-methylpiperazin-1-yl)carbonyloxy-2-(7-nitroquinol-2-yl)isoindolin-1-one (5 g.), which melts at 240°C., is obtained.

3-Hydroxy-2-(7-nitroquinol-2-yl)isoindolin-1-one, which melts at 264°C., can be prepared by reacting potassium borohydride with 7-nitro-2-phthalimidoquinoline in an aqueous-methanolic medium at a temperature of about 20°C.

7-Nitro-2-phthalimidoquinoline, which melts at 295°–297°C., can be prepared by reacting phthalic anhydride with 2-amino-7-nitroquinoline in diphenyl ether at a temperature of about 220°C.

2-Amino-7-nitroquinoline can be prepared by heating 2-chloro-7-nitroquinoline (11.4 g.) and ammonia solution (d = 0.89; 220 cc.) in an autoclave for 24 hours at a temperature of about 130°C. After cooling and releasing the gas, the insoluble product is filtered off and then washed three times with water (total 60 cc.). After drying, 2-amino-7-nitroquinoline (9.8 g.), which melts at 226°–228°C., is obtained.

2-Chloro-7-nitroquinoline can be prepared by heating a solution of 1-methyl-7-nitrocarbostyril (39.1 g.) and phosphorus pentachloride (56.3 g.) in phosphorus oxychloride (192 cc.) at the reflux temperature for 5 hours. After cooling, the reaction mixture is poured onto crushed ice (3 kg.). The insoluble product is filtered off, washed five times with water (total 650 cc.) and then dried in air. On recrystallisation from carbon tetrachloride (700 cc.), 2-chloro-7-nitroquinoline (29.4 g.), which melts at 138°C., is obtained.

1-Methyl-7-nitrocarbostyril can be prepared according to the method described by H. Decker, J. Prakt. Chem., 64, 85 (1901).

EXAMPLE 4

1-Methylpiperazine (13.6 g.) is added to a suspension of 2-(6-nitroquinol-2-yl)-3-phenoxycarbonyloxyisoindolin-1-one (20 g.) in acetonitrile (200 cc.) and the reaction mixture is stirred for 40 hours at a temperature of about 20°C. The crystalline product is filtered off and washed with acetonitrile (15 cc.) and diisopropyl ether (30 cc.). After drying, a product (18 g.), which melts at 210°C., is obtained and is taken up in methylene chloride (250 cc.). The insoluble material (3 g.) is filtered off and the solution obtained is filtered through silica gel (400 g.) contained in a column 5.5 cm. in diameter. Elution is then carried out with methylene chloride (6,000 cc.), a mixture of methylene chloride and methanol (99-1 by volume; 1,000 cc.) and a mixture of methylene chloride and methanol (98-2 by volume; 2,000 cc.). All these eluates are discarded. Further elution is carried out with a mixture of methylene chloride and methanol (98-2 by volume; 2,000 cc.) and the solution obtained is concentrated to dryness under reduced pressure. On recrystallisation of the residue from dimethylformamide (70 cc.), 3-(4-methylpiperazin-1-yl)carbonyloxy-2-(6-nitroquinol-2-yl)isoindolin-1-one (11.1 g.), which melts at 227°C., is obtained.

2-(6-Nitroquinol-2-yl)-3-phenoxycarbonyloxyisoindolin-1-one can be prepared by adding phenyl chloroformate (0.95 g.) to a suspension of 3-hydroxy-2-(6-nitroquinol-2-yl)isoindolin-1-one (1.2 g.) in pyridine (12 cc.), whilst keeping the temperature at about 5°C. When the addition is complete, the reaction mixture is stirred for 3 hours at a temperature of about 20°C. and then water (60 cc.) is added to it. The insoluble product is filtered off and washed successively with water (30 cc.), acetonitrile (10 cc.) and diisopropyl ether (20 cc.). After drying, 2-(6-nitroquinol-2-yl)-3-phenoxycarbonyloxy-isoindolin-1-one (1.6 g.), which melts at 228°–230°C., is obtained.

3-Hydroxy-2-(6-nitroquinol-2-yl)isoindolin-1-one, which melts at 298°C., can be prepared by reacting potassium borohydride with 6-nitro-2-phthalimidoquinoline in an aqueous-methanolic medium at a temperature of about 20°C.

6-Nitro-2-phthalimidoquinoline, which melts at 264°C., can be prepared by reacting phthalic anhydride with 2-amino-6-nitroquinoline in diphenyl ether at a temperature of about 240°C.

2-Amino-6-nitroquinoline can be prepared according to the method described by H. Guthmann, J. Prakt. Chem., 93, 386 (1916).

EXAMPLE 5

Following the procedure of Example 1 but starting with 3-hydroxy-2-(7-methoxyquinol-2-yl)-isoindolin-1-one (7.55 g.) and 1-chlorocarbonyl-4-methylpiperazine (5.05 g.), 3-(4-methylpiperazin-1-yl)-carbonyloxy-2-(7-methoxyquinol-2-yl)isoindolin-1-one (9.7 g.), which melts at 195°C., is obtained after recrystallisation from acetonitrile (400 cc.).

3-Hydroxy-2-(7-methoxyquinol-2-yl)isoindolin-1-one, which melts at 168°C., can be prepared by reacting potassium borohydride with 7-methoxy-2-phthalimidoquinoline in a mixture of dioxan and water (95-5 by volume) at a temperature of about 20°C.

7-Methoxy-2-phthalimidoquinoline, which melts at 208°C., can be prepared by reacting phthalic anhydride with 2-amino-7-methoxyquinoline in diphenyl ether at a temperature of about 240°C.

2-Amino-7-methoxyquinoline, which melts at 85°C., can be prepared by reacting ammonia with 2-chloro-7-methoxyquinoline in the presence of cuprous chloride at a temperature of about 135°C.

2-Chloro-7-methoxyquinoline, which melts at 98°–100°C., can be prepared by reacting phosphorus pentachloride with 7-methoxy-carbostyril in refluxing phosphorus oxychloride.

7-Methoxy-carbostyril can be prepared according to the method described by F. Effenberger and W. Hartmann, Chem. Ber., 102, 3260 (1969).

EXAMPLE 6

Following the procedure of Example 1 but starting with 3-hydroxy-2-(7-methylquinol-2-yl)-isoindolin-1-one (5.8 g.) and 1-chlorocarbonyl-4-methylpiperazine (3.6 g.), 3-(4-methylpiperazin-1-yl)-carbonyloxy-2-(7-methylquinol-2-yl)isoindolin-1-one (6.95 g.), which melts at 162°–163°C., is obtained after recrystallisation from acetonitrile (50 cc.).

3-Hydroxy-2-(7-methylquinol-2-yl)isoindolin-1-one, which melts at 175°C., can be prepared by reacting potassium borohydride with 7-methyl-2-phthalimidoquinoline in a mixture of dioxan and water (95-5 by volume) at a temperature of about 20°C.

7-Methyl-2-phthalimidoquinoline, which melts at 197°C., can be prepared by reacting phthalic anhydride with 2-amino-7-methylquinoline in diphenyl ether at a temperature of about 205°C.

2-Amino-7-methylquinoline, which melts at 134°–135°C., can be prepared by reacting ammonia with 2-chloro-7-methylquinoline in the presence of cuprous chloride at a temperature of about 120°C.

2-Chloro-7-methylquinoline can be prepared according to the method described by J. D. Capps, J. Am. Chem. Soc., 69, 179 (1947).

EXAMPLE 7

A solution of 3-(4-methylpiperazin-1-yl)-carbonyloxy-2-(7-chloroquinol-2-yl)isoindolin-1-one (6 g.) in chloroform (42 cc.) is added to a suspension of p-nitroperbenzoic acid (3 g.) in chloroform (150 cc.). The reaction mixture is then stirred for 3 hours at a temperature of about 25°C. An aqueous 4N sodium hydroxide solution (10 cc.) is then added and the mixture is stirred for 10 minutes. Anhydrous sodium sulphate (150 g.) is then added, stirring is continued for 10 minutes and then the sodium sulphate is filtered off and washed three times with chloroform (total 150 cc.). The solution obtained is concentrated to dryness under reduced pressure and the residue obtained is dissolved in a mixture of acetone and water (80-20 by volume; 100 cc.). The solution obtained is treated with decolourising charcoal and is filtered, and then distilled water (200 cc.) is added to it. The product which crystallises is filtered off and washed with distilled water (20 cc.). After drying, 4-[2-(7-chloroquinol-2-yl)-1-oxoisoindolin-3-yl]-oxycarbonyl-1-methylpiperazine 1-oxide monohydrate (6.6 g.) is obtained, which undergoes transformation at about 170°C. and then melts at 240°C.

The present invention includes within its scope pharmaceutical compositions comprising, as active ingredient, at least one of the isoindoline derivatives of general formula I, or a non-toxic acid addition salt thereof, in association with a pharmaceutical carrier or coating. The invention includes especially such preparations made up for oral, parenteral or rectal administration.

Solid compositions for oral administration inciuide tablets, pills, powders and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water or liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilized by, for example, filtration through a bacteria-retaining filter, by incorporation in the compositions of sterilizing agents, by irradiation, or by heating. They may also be manufactured in the form of sterile solid compositions which can be dissolved in sterile water or some other sterile injectable medium immediately before use.

Compositions for rectal administration are suppositories which contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions when administered orally to an adult should generally give doses between 50 mg. and 500 mg. of active substance per day. In general the physician will decide the posology considered appropriate, taking into account the age and weight and other factors intrinsic to the patient being treated.

The following Example illustrate pharmaceutical compositions according to the invention.

EXAMPLE 8

Tablets containing 25 mg. of active product and having the following composition are prepared in accordance with the usual technique:

| | |
|---|---|
| 3-(4-methylpiperazin-1-yl)carbonyloxy-2-(7-chloroquinol-2-yl)isoindolin-1-one | 0.025 g. |
| starch | 0.090 g. |
| precipitated silica | 0.030 g. |
| magnesium stearate | 0.005 g. |

We claim:

1. An isoindoline of the formula:

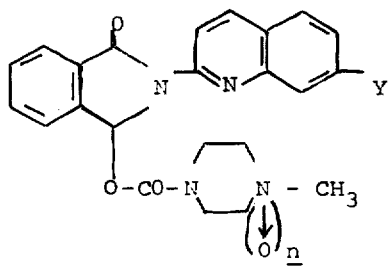

wherein Y is halogen, alkyl of 1 to 4 carbon atoms, alkoxy of 1 to 4 carbon atoms or nitro, and $n$ is zero or 1, or a pharmaceutically acceptable non-toxic acid addition salt thereof.

2. The isoindoline according to claim 1 which is 3-(4-methylpiperazin-1-yl)carbonyloxy-2-(7-chloroquinol-2-yl)isoindolin-1-one or a pharmaceutically acceptable non-toxic acid addition salt thereof.

3. The isoindoline according to claim 1 which is 3-(4-methylpiperazin-1-yl)carbonyloxy-2-(7-nitroquinol-2-yl)isoindolin-1-one or a pharmaceutically acceptable non-toxic acid addition salt thereof.

4. The isoindoline according to claim 1 which is 3-(4-methylpiperazin-1-yl)carbonyloxy-2-(7-methoxyquinol-2-yl)isoindolin-1-one or a pharmaceutically acceptable non-toxic acid addition salt thereof.

5. The isoindoline according to claim 1 which is 3-(4-methylpiperazin-1-yl)carbonyloxy-2-(7-methylquinol-2-yl)isoindolin-1-one or a pharmaceutically acceptable non-toxic acid addition salt thereof.

6. The isoindoline according to claim 1 which is 4-[2-(7-chloroquinol-2-yl)-1-oxoisoindolin-3-yl]-oxycarbonyl-1-methylpiperazin 1-oxide or a pharmaceutically acceptable non-toxic acid addition salt thereof.

7. An isoindoline according to claim 1 wherein $n$ is zero, or a pharmaceutically acceptable non-toxic acid addition salt thereof.

8. An isoindoline according to claim 1 wherein Y is chlorine, methyl, methoxy or nitro, or a pharmaceutically acceptable non-toxic acid addition salt thereof.

* * * * *